(12) United States Patent
Lange et al.

(10) Patent No.: US 7,579,412 B2
(45) Date of Patent: Aug. 25, 2009

(54) METHOD FOR PRODUCING CARBOXYL-TERMINATED POLYISOBUTENES

(75) Inventors: Arno Lange, Bad Duerkheim (DE); Helmut Mach, Heidelberg (DE); Hans Peter Rath, Gruenstadt (DE); Ulrich Karl, Ludwigshafen (DE); Bela Ivan, Budapest (HU); Peter Werner Groh, Budapest (HU); Zsuzsanna Tamara Nagy, Budapest (HU); Viktoria Palfi, Budapest (HU)

(73) Assignee: BASF Aktiengesellschaft, Ludwigshafen (DE)

( * ) Notice: Subject to any disclaimer, the term of this patent is extended or adjusted under 35 U.S.C. 154(b) by 633 days.

(21) Appl. No.: 10/556,808

(22) PCT Filed: May 14, 2004

(86) PCT No.: PCT/EP2004/005202

§ 371 (c)(1),
(2), (4) Date: Nov. 15, 2005

(87) PCT Pub. No.: WO2004/101631

PCT Pub. Date: Nov. 25, 2004

(65) Prior Publication Data

US 2006/0276588 A1    Dec. 7, 2006

(30) Foreign Application Priority Data

May 16, 2003   (DE) ................. 103 22 164

(51) Int. Cl.
*C08C 19/04*   (2006.01)

(52) U.S. Cl. .............. 525/383; 525/387; 525/388
(58) Field of Classification Search .......... 525/383, 525/387, 388
See application file for complete search history.

(56) References Cited

U.S. PATENT DOCUMENTS 3,427,351 A * 2/1969 Nakagawa et al. ....... 149/19.91
4,076,738 A   2/1978 Pecoraro

FOREIGN PATENT DOCUMENTS

| EP | 0 123 424 | 10/1984 |
|---|---|---|
| EP | 0 384 086 | 8/1990 |
| WO | 01/55229 | 8/2001 |

OTHER PUBLICATIONS

Kwon et al. "Synthesis and Characterization of Poly(isobutylene-b-pivalolactone) Diblock and Poly(pivalolactone-b-isobutylene-b-pivalolactone) Triblock Copolymers", Macromolecules, vol. 35, pp. 3348-3357 2002.
Nemes et al. "Oxyethylation and carbonation of telechelic polyisobutylene anions", Polymer Bulletin, vol. 24, pp. 187-194 1990.
Storey et al. "Synthesis and Characterization of beta, beta-Dimethyl-Branched Carboxylic Acid-Terminated Polyisobutylenes", Polym. Prepr., vol. 38, No. 2, pp. 283-284 1997.

* cited by examiner

*Primary Examiner*—Ling-Siu Choi
(74) *Attorney, Agent, or Firm*—Oblon, Spivak, McClelland, Maier & Neustadt, P.C.

(57) ABSTRACT

The present invention relates to a process for preparing carboxyl-terminated polyisobutenes by ozonolysis of polyisobutenes terminated by an ethylenically unsaturated double bond.

8 Claims, No Drawings

METHOD FOR PRODUCING CARBOXYL-TERMINATED POLYISOBUTENES

The present invention relates to a process for preparing carboxyl-terminated polyisobutenes.

Processes for preparing carboxyl-terminated polyisobutenes are known. Thus, in Macromolecules 2002, 35, 3348-3357, Y. Kwon et al. describe the reaction of "living" polyisobutene chains with 1,1-diphenylethylene and subsequent quenching with 1-methoxy-1-trimethylsiloxypropene to give a polyisobutene terminated by a methoxycarbonyl group which is hydrolyzed to the carboxyl-terminated polyisobutene. A disadvantage of this process is the use of 1-methoxy-1-trimethylsiloxypropene which is expensive to prepare and is not available commercially.

EP 0 123 424 describes the reaction of polyolefins with a hydroperoxide and a peroxide to give a mixture of carbonyl- and carboxyl-terminated polyolefins. A disadvantage here is the use of explosive peroxides. In addition, the yield of carboxyl-terminated polyolefins is not satisfactory.

In Polymer Bulletin 24, 187-194 (1990), S. Nemes et al. describe the reaction of polyisobutene terminated by a —C(CH$_3$)$_2$Cl group with potassium tert-butoxide and n-butyllithium to form the corresponding polyisobutene anion and subsequent reaction of the anion with carbon dioxide to give the carboxyl-terminated polyisobutene. A disadvantage here is the use of expensive and hydrolysis-sensitive reagents, which makes the process unsuitable for use on a large scale.

U.S. Pat. No. 3,427,351 describes the reaction of a copolymer obtained by copolymerization of isobutene with a conjugated diene with ozone and subsequent reaction of the ozonolysis products with a strong oxidant or in a haloform reaction to give carboxyl-terminated polyisobutenes. A disadvantage here is that the copolymer used is fragmented in order to obtain carboxyl-terminated polyisobutenes. Uniform polymers having a narrow molecular weight distribution cannot be obtained by this process.

In Polym. Prep. 1997, 38 (2), 283, R. F. Storey et al. describe the reaction of polyisobutene terminated by a —C(CH$_3$)$_2$Cl group with potassium tert-butoxide to form the corresponding elimination product having an ethylenically unsaturated end and the reaction of this with ozone to form polyisobutene terminated by a methyl ketone group. This is subsequently reacted in a haloform reaction to give the carboxyl-terminated polyisobutene.

An additional disadvantage of the last three processes mentioned is that the polyisobutenes can be converted into the corresponding carboxyl-terminated products only by means of a plurality of costly steps.

It is an object of the present invention to provide a simplified process for preparing carboxyl-terminated polyisobutenes.

We have found that this object is achieved by a process for preparing carboxyl-terminated polyisobutenes, which comprises reacting a polyisobutene which is terminated by an ethylenically unsaturated double bond and has the formula I $$A\text{-}(M\text{-}B)_n \quad (I)$$

where
A is a radical derived from a polymerization initiator,
M is a polymer chain comprising repeating units of the formula II $$\text{-[CH}_2\text{---C(CH}_3)_2\text{]-} \quad (II),$$

B is a radical of the formula III or IV $$\text{---CH}_2\text{---CH}\text{=}\text{CH}_2 \quad (III)$$

$$\text{---CH}\text{=}\text{CR}^1\text{R}^2 \quad (IV)$$

where
R$^1$ and R$^2$ are each H, C$_1$-C$_4$-alkyl or aryl and
n is from 1 to 6, with ozone and, if appropriate, subsequently heating the reaction product obtained to from 60 to 150° C.

For the purposes of the present invention, a carboxyl-terminated polyisobutene is a polyisobutene which has a carboxyl group bound to one or more chain ends of the polyisobutene group. For the purposes of the present invention, a chain end is the last carbon atom of the polymer skeleton at each end of the polymer chain. A carboxyl group is, for the present purposes, a —COOH or —COO$^-$M$^{m+}_{1/m}$ group. Here, M$^{m+}_{1/m}$ is a cation equivalent. Preferred cation equivalents are derived from alkali metal cations and alkaline earth metal cations, e.g. lithium, sodium, potassium, magnesium or calcium, and from ammonium cations [NR$^a$R$^b$R$^c$R$^d$]$^+$, where R$^a$, R$^b$, R$^c$ and R$^d$ are each, independently of one another, H, C$_1$-C$_6$-alkyl, aryl, or aralkyl.

In the formula IV, R$^1$ and R$^2$ are preferably identical. Particular preference is given to both R$^1$ and R$^2$ being aryl, in particular phenyl. Alternatively, both R$^1$ and R$^2$ are particularly preferably methyl.

An important feature of the group B is that the β-carbon atom of the double bond, i.e. that carbon atom which is farther in the interior of the polymer chain, bears a hydrogen atom.

A is a radical derived from a polymerization initiator. The structure of this radical depends substantially on the type of polymerization by means of which the polyisobutene starting material is prepared. If the cationic polymerization is, for example, stopped hydrolytically, A can be, for example, a tert-butyl radical. If the polyisobutene is prepared, for example, under the conditions of a living cationic polymerization in the presence of an initiator molecule "(Inifer)", then A can also be a radical derived from the initiator molecule. Examples of such initiator molecules and radicals derived therefrom are described, for example, in WO 02/48215, EP 0 713 883 or EP 0 279 456, which are hereby expressly incorporated by reference.

n is, for example, a number >1, when the polyisobutene starting material is prepared under the conditions of a living cationic polymerization in the presence of an initiator molecule which is at least bifunctional, i.e. from which at least two polymer chains can extend. n is preferably from 1 to 3, particularly preferably 1 or 2 and especially 1.

For the purposes of the present invention, C$_1$-C$_4$-alkyl is methyl, ethyl, propyl, isopropyl, n-butyl, sec-butyl, isobutyl or tert-butyl, preferably methyl. C$_1$-C$_6$-alkyl can also be pentyl, hexyl and structural isomers thereof.

Aryl is preferably substituted or unsubstituted phenyl or naphthyl. Suitable substituents are —OC$_1$-C$_4$-alkyl and halogen. Aryl is particularly preferably phenyl, in particular unsubstituted phenyl.

Aralkyl is preferably benzyl or 1- or 2-phenylethyl.

Halogen is preferably fluorine, chlorine or bromine.

Polyisobutenes of the formula I which are terminated by ethylenically unsaturated double bonds are known to those skilled in the art. Thus, polyisobutenes I in which B is a radical IV in which R$^1$ and R$^2$ are each methyl can be obtained, for example, by stopping the polymerization reaction hydrolytically and, if necessary, subjecting the hydrolysis product to a subsequent elimination under suitable conditions. Such polyisobutenes and processes for preparing them are described, for example, in J. P. Kennedy, B. Iván, "Designed Polymers by Carbocationic Macromolecular Engineering", Oxford University Press, New York 1991.

Polyisobutenes of the formula I in which B is a radical IV in which $R^1$ and $R^2$ are each phenyl can be obtained, for example, by reacting the living polymer in a living cationic polymerization of isobutene with 1,1-diphenylethylene and a base to give a diphenylvinyl-capped polyisobutene. Such diphenylvinyl-capped polyisobutenes and methods of preparing them are described, for example, by J. Feldthusen, B. Iván, A. H. E. Müller and J. Kops in Macromol. Rep. 1995, A32, 639, J. Feldthusen, B. Iván and A. H. E. Müller in Macromolecules 1997, 30, 6989 and in Macromolecules 1998, 31, 578, in DE-A 19648028 and in DE-A 19610350, which are hereby expressly incorporated by reference.

Polyisobutenes of the formula I in which B is a radical III can be obtained, for example, by reacting the living polymer in a living cationic polymerization of isobutene with allyltrimethylsilane to give an allyl-capped polymer. Allyl-capped polyisobutenes and methods of preparing them are described, for example, by B. Iván and J. P. Kennedy in J. polym. Sci. Part A: Chem. Ed. 1990, 28, 89, which are hereby expressly incorporated by reference.

Other olefinically terminated polyisobutenes I are obtainable by analogous procedures.

The polyisobutenes of the formula I preferably have a number average molecular weight $M_n$ of from 100 to 500 000, particularly preferably from 100 to 50 000, more preferably from 500 to 20 000, in particular from 900 to 12 000 and especially from 900 to 3 000.

For the purposes of the present invention, the term "polyisobutene" also encompasses oligomeric isobutenes, e.g. dimeric, trimeric or tetrameric isobutene, which are terminated by an ethylenically unsaturated double bond.

For the purposes of the present invention, polyisobutenes also include all polymers which are obtainable by cationic polymerization and comprise preferably at least 60% by weight of isobutene, particularly preferably at least 80% by weight, more preferably at least 90% by weight and in particular at least 95% by weight of (co)polymerized isobutene. In addition, further butene isomers such as 1- or 2-butene and other olefinically unsaturated monomers which can be copolymerized with isobutene under cationic polymerization conditions can be present in copolymerized form in the polyisobutenes.

Isobutene feedstuffs which can be used for preparing polyisobutenes which are suitable as starting materials for the process of the present invention accordingly include both isobutene itself and isobutene-containing $C_4$-hydrocarbon streams, for example $C_4$ raffinates, $C_4$ fractions from the dehydrogenation of isobutene, $C_4$ fractions from steam crackers and FCC plants (FCC: fluid catalytic cracking), as long as they have been largely freed of 1,3-butadiene present therein. Particularly suitable $C_4$-hydrocarbon streams generally contain less than 500 ppm, preferably less than 200 ppm, of butadiene. When $C_4$ fractions are used as starting material, the hydrocarbons other than isobutene assume the role of an inert solvent.

Possible copolymerizable monomers are vinyl aromatics such as styrene and α-methylstyrene, $C_1$-$C_4$-alkylstyrenes such as 2-, 3- and 4-methylstyrene, and also 4-tert-butylstyrene, isoolefins having from 5 to 10 carbon atoms, e.g. 2-methyl-1-butene, 2-methyl-1-pentene, 2-methyl-1-hexene, 2-ethyl-1-pentene, 2-ethyl-1-hexene and 2-propyl-1-heptene. Possible comonomers also include olefins which contain a silyl group, e.g. 1-trimethoxysilylethene, 1-(trimethoxysilyl) propene, 1-(trimethoxysilyl-2-methyl-2-propene, 1-[tri (methoxyethoxy)silyl]ethene, 1-[tri(methoxyethoxy)silyl] propene, and 1-[tri(methoxyethoxy)silyl]-2-methyl-2-propene.

Depending on the polymerization process, the polydispersity index PDI ($=M_w/M_n$) of the polyisobutenes obtained is from about 1.01 to 10. Polymers from living cationic polymerization generally have a PDI of from about 1.01 to 2.0. In the process of the present invention, preference is given to using polyisobutenes having a PDI of from 1.01 to 1.5.

The reaction of the polyisobutene of the formula I with ozone is carried out essentially according to customary methods of the prior art, as are described, for example, in "Organikum", $15^{th}$ Edition, VEB Deutscher Verlag der Wissenschaften, p. 330 ff, or in J. March, Advanced Organic Chemistry, Wiley, New York, $3^{rd}$ Edition, p. 1066-1070 and in the literature cited in each of these. The ozonolysis is generally carried out in a suitable solvent. Suitable solvents are, for example, alkanes such as pentane, hexane, heptane, octane, nonane, decane or petroleum ether, cycloalkanes such as cyclohexane or cyclooctane, haloalkanes such as methyl chloride, methylene chloride, chloroform, carbon tetrachloride, dichloroethane, trichloroethane or tetrachloroethane, and carboxylic acid derivatives such as ethyl acetate, propyl acetate or dimethyl formamide. It is also possible to use protic solvents such as water, $C_1$-$C_4$-alcohols such as methanol, ethanol, propanol, isopropanol or the butanols, and also carboxylic acids such as acetic acid or propionic acid. Mixtures of the abovementioned solvents are also suitable. Preference is given to using at least one alkane, in particular hexane, and/or at least one haloalkane, in particular methylene chloride, chloroform or carbon tetrachloride, as solvent.

The ozonolysis is preferably carried out at from -100 to +40° C., particularly preferably from -78 to +30° C., in particular from -25° C. to 25° C. and especially from 0° C. to 20° C.

The ozone used in the process of the present invention is usually produced by customary methods, for example by means of an ozone generator (ozonizer) into which air or oxygen is passed. The stream leaving the ozonizer generally contains from about 3 to 4% by volume, especially from 3.4 to 3.8% by volume, of ozone.

The reaction of the polyisobutene I with ozone is carried out, for example, by placing the polyisobutene I together with a suitable solvent in a reaction vessel, bringing this solution to the desired reaction temperature and subsequently passing ozone or an ozone-containing gas mixture as is generated, for example, by means of the ozonizer into the solution.

The speed of ozone introduction depends, inter alia, on the batch size and on the ozone concentration in the gas stream passed in and is set in each particular case. It is preferably selected so that the heat of reaction formed in the exothermic reaction of ozone with polyisobutene can readily be removed.

The time for which ozone is introduced depends, inter alia, on the batch size, on the ozone concentration in the gas stream passed in and on the speed at which it is introduced and is determined in each individual case. However, preference is given to introducing ozone at least until the reaction mixture takes on a bluish color attributable to the presence of unreacted ozone.

After the introduction of ozone is complete, the reaction mixture is preferably allowed to react for a further time which also depends on the batch size and has to be determined in each individual case. The temperature of this after-reaction is preferably from -78 to 40° C., in particular from -25 to 25° C.

Ozone still present after this may subsequently be removed from the reaction mixture, for example by passing a stream of oxygen, air or inert gas through it.

After removal of the ozone has been completed, which can, for example, be recognized by decolorization of the solution, the reaction mixture is generally worked up by customary methods and, if desired, subjected to a thermal after-treatment by heating it to from 60 to 150° C., preferably from 70 to 120° C. and in particular from 70 to 100° C. It is also possible to subject the reaction mixture to the thermal treatment without prior work-up.

The thermal after-treatment is carried out particularly when a polyisobutene of the formula I in which B is a radical of the formula III is used as starting material. On the other hand, if a polyisobutene of the formula I in which B is a radical of the formula IV is used as starting material, in particular when $R^1$ and $R^2$ in the radical IV are each phenyl, a thermal after-treatment is usually not necessary and the carboxyl-terminated polymer is generally obtained directly.

The work-up of the reaction mixture from the ozonolysis is generally carried out by customary methods, for example by removing at least part of the solvent used in the ozonolysis, if appropriate taking up the partly or fully evaporated product in a suitable solvent, for example in an alkane such as pentane, hexane or heptane, and precipitating the product by mixing the solution with a solvent in which the ozonolysis product is not soluble, for example an alkanol such as methanol or ethanol. If the ozonolysis has been carried out in an alkane or another solvent in which the ozonolysis product is soluble, the precipitation of the ozonolysis product can of course also be carried out directly from the reaction mixture. The work-up can also be carried out by chromatography or extraction.

If the thermal after-treatment is carried out after work-up of the reaction mixture from the ozonolysis, the product which has been isolated is generally taken up in a suitable solvent and heated to from 60 to 150° C., preferably from 70 to 120° C., in particular from 70 to 100° C. Suitable solvents are those having a relatively high boiling point, e.g. aromatic hydrocarbons such as toluene, the xylenes, chlorobenzene and nitrobenzene, DMSO, higher alkanes, e.g. $C_7$-$C_{20}$-alkanes such as octadecane, mineral oil fractions and mixtures thereof. Preference is given to using aromatic hydrocarbons.

The duration of the thermal after-treatment depends, inter alia, on the batch size and reaction rate and is determined in each individual case.

If the thermal after-treatment is carried out without prior work-up of the reaction mixture from the ozonolysis, the reaction mixture is appropriately freed of at least part of the solvent, which can be carried out, for example, by distillation, if desired under reduced pressure. The residue is subsequently taken up in at least one of the abovementioned relatively high-boiling solvents and heated to the abovementioned temperature. This procedure is advantageous particularly when the solvent used in the ozonolysis has a boiling point which is below the temperature at which the thermal after-treatment is to be carried out. However, it is also possible to transfer the entire reaction mixture into the relatively high-boiling solvent without removing the solvent from the ozonolysis. However, if the solvent used in the ozonolysis has a boiling point which is sufficiently high for the thermal after-treatment, it generally does not have to be replaced by the abovementioned solvents and the thermal treatment is carried out in this solvent.

The work-up of the reaction mixture after the thermal treatment is usually carried out by customary methods, for example by removing at least part of the solvent used in the thermal treatment, if appropriate taking up the partly or fully evaporated product in a suitable solvent, for example in an alkane such as pentane, hexane or heptane, and precipitating the product by mixing the solution with a solvent in which the carboxyl-terminated polyisobutene is not soluble, for example an alkanol such as methanol or ethanol. The work-up can also be carried out by chromatography or extraction.

The carboxyl-terminated polyisobutenes obtainable by the process of the present invention can be converted into any derivatives by conventional methods of the prior art. Thus, the carboxyl groups can be converted into, for example, carboxylic acid salts, ester groups, amide groups, imide groups, amidines, anhydrides or carboxylic acid halides.

The process of the present invention allows carboxyl-terminated polyisobutenes to be prepared in virtually quantitative yields in a simple fashion by ozonolysis of polyisobutenes terminated by ethylenically unsaturated double bonds without complex oxidation steps of the ozonolysis.

The following examples illustrate the invention without restricting its scope.

EXAMPLES

1. Preparation of Polyisobutenes of the Formula I 1.1 Preparation of an Allyl-Terminated Polyisobutene (B=Radical of the Formula III) by Living Cationic Polymizeration 1.49 g (0.01 mol) of 2-chloro-2,4,4-trimethylpentane (TMPCl), 1.16 g (0.01 mol) of N, N,N',N'-tetramethylethylenediamine (TMEDA) and 30.35 g (0.16 mol) of titanium tetrachloride together with a mixture of 600 ml of n-hexane and 400 ml of dichloromethane were placed in a reaction vessel at −78° C. under an inert gas atmosphere and, while stirring, 13.47 g (0.24 mol) of isobutene were then introduced into this reaction mixture. After stirring for 3-5 minutes at this temperature, the reaction mixture was admixed with 3.43 g (0.03 mol) of allyltrimethylsilane and the mixture was stirred for a further 30 minutes at this temperature. To work up the reaction mixture, it was quenched with 100 ml of methanol, the upper phase of the two-phase mixture formed was separated off and this was evaporated to a concentration of from 40 to 50%. This concentrated polymer solution was then added dropwise to 10 times its volume of methanol, resulting in precipitation of the polymer formed. After decanting off the methanol, the precipitate was taken up in 200 ml of n-hexane. The solution was washed three times with water, dried over magnesium sulfate, filtered and freed of the solvent. Drying the precipitate in a vacuum drying oven gave the allyl-terminated polyisobutene product in the form of a colorless, highly viscous oil having a number average molecular weight $M_n$ of 1300 and a PDI of 1.04. The molecular weight was determined by means of GPC (gel permeation chromatography).

$^1$H-NMR (CDCl$_3$; 400 MHz): 5.84 (m, 1H, —CH=), 5.00 (t, 2H, =CH$_2$), 2.02 (d, 2H, —CH$_2$—CH=CH$_2$), 1.0-1.6 (m, CH$_3$-groups of the polymer chain); 0.99 (—C(CH$_3$)$_3$).

1.2 Preparation of a Diphenylvinyl-Terminated Polyisobutene of the Formula I (B=Radical of the Formula IV; $R^1$, $R^2$=Phenyl) by Living Cationic Polymerization 1.49 g (0.01 mol) of TMPCl, 1.16 g (0.01 mol) of TMEDA and 30.35 g (0.16 mol) of TiCl$_4$ together with a mixture of 600 ml of n-hexane and 400 ml of methylene chloride were placed in a reaction vessel at −78° C. under a nitrogen atmosphere and 13.47 g (0.24 mol) of isobutene were then introduced at this temperature while stirring. After stirring for 5 minutes at this temperature, 3.60 g (0.02 mol) of 1,1-diphenylethylene were added, resulting in the color of the reaction mixture changing from yellow to red. After stirring for a further 45 minutes, the reaction mixture was quenched with excess methanol, resulting in decolorization of the mixture. The upper phase of the resulting two-phase mixture was separated off and the solvents were removed therefrom. The residue was taken up in chloroform and stirred for about 12 hours at room temperature in the presence of catalytic amounts of HCl. After evaporation of the solvent under reduced pressure, the residue was dissolved in n-hexane and precipitated in methanol. The methanol was decanted off and the residue was taken up in n-hexane. The solution was dried over magnesium sulfate for 24 hours, filtered and freed of solvent under reduced pressure. Drying of the precipitate in a vacuum drying oven gave the 2,2-diphenylvinyl-terminated polyisobutene product in the form of an oil having a number average molecular weight $M_n$ of 1700 and a PDI of 1.02.

$^1$H-NMR (CDCl$_3$; 400 MHz): 7.1-7.4 (m, 10H, phenyl); 6.13 (s, 1H, CH=C(Ph)$_2$); 1.0-1.6 (m, CH$_2$-groups of the polymer chain); 0.99 (s, 9H, —C(CH$_3$)$_3$.

2. Ozonolysis 2.1 Ozonolysis of the Product from Example 1.1

Ozone was generated by passing oxygen (about 5 l/h) into a microozonizer from Fischer Scientific Co. The ozonizer produced about 0.15 mmol of ozone/min at an oxygen introduction rate of about 100 ml/min.

1 g of the polyisobutene from example 1.1 together with 10 ml of a solvent mixture of n-hexane and methylene chloride (volume ratio=2:8) were placed in a reaction vessel at 25° C. and ozone was passed into the reaction mixture for 4 hours at a flow rate of 5 l/h. After the introduction of ozone had been completed, the solvents were evaporated and the residue was dissolved in 5 ml of n-hexane. The solution was subsequently poured into ten times its volume of methanol, resulting in precipitation of the ozonolysis product. After decanting off the methanol, the precipitate was dried in a vacuum drying oven. This gave a product mixture comprising the carboxyl-terminated polyisobutene together with carbonyl-terminated polymers and ozonides.

$^1$H-NMR (CDCl$_3$; 400 MHz): 5.20 (s, 2H, CH$_2$—CH=C H$_2$.O$_3$*); 5.18 (m, 1H, CH$_2$—CH=CH$_2$.O$_3$*); 4.99 (s, 2H, CH$_2$—CH=CH$_2$.O$_3$*); 2.35 (s, 2H, —CH$_2$—CHO); 2.34 (m, 2H, —CH$_2$—COOH); 1.0-1.6 (m, CH$_3$— groups of the polymer chain); 0.99 (s, 9H, —C(CH$_3$)$_3$).

IR [cm$^{-1}$] (film on KBr): 2500-3500 (OH); 1712 (CO); 1707 (CO); 1105; 1060 (CH=CH$_2$.O$_3$*)

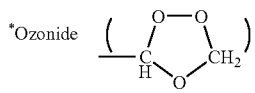

Thermal After-Treatment:

0.4 g of the product mixture from the ozonolysis was dissolved in 20 ml of toluene and heated at 80° C. for 6 hours under inert gas. Toluene was subsequently evaporated until a 40-50% strength solution had been obtained, and this was then added dropwise to ten times its volume of methanol, resulting in precipitation of the product. After decanting off the methanol, the precipitate was dried at room temperature in a vacuum drying oven to give the carboxyl-terminated polyisobutene product in quantitative yield.

$^1$H-NMR (CDCl$_3$; 400 MHz): 2.34 (s, 2H, —C H$_2$—COOH), 1.0-1.6 (m, CH$_3$— groups of the polymer chain); 0.99 (s, 9H, —C(CH$_3$)$_3$).

IR [cm$^{-1}$] (film on KBr): 2500-3500 (OH); 1707 (CO).

2.2 Ozonolysis of the Product from Example 1.2

The ozone was generated in the abovementioned ozonizer.

1 g of the polyisobutene from example 1.2 together with 10 ml of methylene chloride were placed in a reaction vessel at room temperature and ozone was passed into the reaction mixture for 4 hours at a flow rate of 5 l/h. After introduction of ozone had been completed, a stream of nitrogen was passed through the reaction solution for 5 minutes to remove excess ozone. The solvent was then evaporated, the residue was dissolved in n-hexane and the product was precipitated by pouring the solution through methanol. After decanting off the methanol, the precipitate was dried in a vacuum drying oven to give the carboxyl-terminated polyisobutene product in quantitative yield.

$^1$H-NMR (CDCl$_3$; 400 MHz): 1.72 (s, 2H, —C H$_2$—C(CH$_3$)$_2$—COOH), 1.0-1.6 (m, CH$_3$— groups of the polymer chain); 0.99 (s, 9H, —C(CH$_3$)$_3$).

IR [cm$^{-1}$] (film on KBr): 2500-3500 (OH); 1700 (CO).

We claim:

1. A process for preparing carboxyl-terminated polyisobutenes, comprising:
   reacting ozone with a polyisobutene of formula I $$A(M-B)_n \qquad (I)$$

and
   carrying out a thermal after-treatment by heating the reaction product obtained from the ozone reaction to from 60 to 150° C.,
   wherein
   A is a radical derived from a polymerization initiator,
   M is a polymer chain comprising repeating units of the formula II $$[CH_2—C(CH_3)_2] \qquad (II),$$

and
   B is a radical of the formula III or IV $$—CH_2—CH=CH_2 \qquad (III)$$

$$—CH=CR^1R^2 \qquad (IV)$$

wherein
   R$^1$ and R$^2$ are each H, C$_1$-C$_4$-alkyl or phenyl, and
   n is from 1 to 6, and
   wherein the thermal heat treatment of the reaction product obtained from the ozone reaction is optional when B is a radical of formula IV and R$^1$ and R$^2$ are phenyl.

2. The process as claimed in claim 1, wherein R$^1$ and R$^2$ are each a phenyl.

3. The process as claimed in claim 1, wherein R$^1$ and R$^2$ are each a methyl.

4. The process as claimed in claim 1, wherein the reaction product obtained from the ozone reaction is in each case, according to Formula III or IV, heated to from 70 to 120° C.

5. The process as claimed in claim 1, wherein a temperature of the ozone reaction is from −100 to 40° C.

6. The process according to claim 1, wherein a number average molecular weight of the polyisobutene of formula (I) is from 100 to 500,000.

7. The process according to claim 1, wherein the ozone reaction is carried out in a solvent selected from the group consisting of an alkane, a cycloalkane, a haloalkane, a carboxylic acid derivative, a C$_{1-4}$ alcohol, a carboxylic acid, water and mixtures thereof.

8. The process according to claim 7, wherein the solvent is an alkane or a haloalkane.

* * * * *